United States Patent
Xu et al.

(10) Patent No.: US 7,924,755 B2
(45) Date of Patent: Apr. 12, 2011

(54) SYSTEMS AND METHODS FOR RESTRICTING THE LOCATION OF CONTROL INFORMATION IN PHYSICAL LAYER SIGNALING

(75) Inventors: Shugong Xu, Vancouver, WA (US); Kimihiko Imamura, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 825 days.

(21) Appl. No.: 11/855,920

(22) Filed: Sep. 14, 2007

(65) Prior Publication Data

US 2009/0074090 A1 Mar. 19, 2009

(51) Int. Cl.
*G08C 17/00* (2006.01)
(52) U.S. Cl. ...................................... 370/311
(58) Field of Classification Search .......... 370/311, 370/329, 352, 328, 347, 335, 350, 465, 524, 370/281; 455/561, 522, 562.1, 423, 502, 455/562
See application file for complete search history.

(56) References Cited

U.S. PATENT DOCUMENTS

| | | | |
|---|---|---|---|
| 7,379,430 B2 * | 5/2008 | Duplessis et al. | 370/281 |
| 7,756,548 B2 * | 7/2010 | Laroia et al. | 455/561 |
| 2007/0160003 A1 | 7/2007 | Meier | |
| 2007/0177569 A1 | 8/2007 | Lundby | |
| 2009/0046789 A1 * | 2/2009 | Xu et al. | 375/260 |

OTHER PUBLICATIONS

R1-072613, "Way forward on CCE-to-RE mapping," Jun. 2007.
R1-072556, "E-UTRA DL L1/L2 Invariant Control Channel Design," May 2007.
R1-072884, "Cell-specific Interleaving for CCE-to-RE mapping," Jun. 2007.
3GPP TS 36.211 V1.1.0, "Physical Channels and Modulation (Release 8)," May 2007.
R1-072689, "Downlink Acknowledgement Mapping to RE's," Jun. 2007.
R1-072789, "Mapping of CCEs (control channel element) onto physical resource," Jun. 2007.
R2-072599, "DRX for VoIP," Jun. 2007.
R2-072777, "Semi-persistent Scheduling and DRX Control," Jun. 2007.
R2-072604, "DRX handling in mixed case," Jun. 2007.
3GPP TS 36.300 V8.1.0, "Evolved Universal Terrestrial Radio Access (E-UTRA) and Evolved Universal Terrestrial Radio Access Network (E-UTRAN)," Jun. 2007.

* cited by examiner

*Primary Examiner* — Chi H Pham
*Assistant Examiner* — Alexander Boakye
(74) *Attorney, Agent, or Firm* — Austin Rapp & Hardman

(57) ABSTRACT

A method for conserving the power supply of an Orthogonal Frequency Division Multiplexing (OFDM) communications device is described. The location of control information within one or two of a plurality of symbols is obtained. A sleep mode is entered into. The one or two symbols that include the control information are monitored. A return to the sleep mode is executed.

22 Claims, 14 Drawing Sheets

SYSTEMS AND METHODS FOR RESTRICTING THE LOCATION OF CONTROL INFORMATION IN PHYSICAL LAYER SIGNALING

TECHNICAL FIELD

The present disclosure relates generally to communications and wireless communications systems. More specifically, the present disclosure relates to systems and methods for restricting the location of control information in physical layer signaling in order to conserve the power supply of a communications device.

BACKGROUND

The 3rd Generation Partnership Project, also referred to as "3GPP," is a collaboration agreement that aims to define globally applicable Technical Specifications and Technical Reports for 3rd Generation Systems. 3GPP Long Term Evolution (LTE) is the name given to a project to improve the Universal Mobile Telecommunications System (UMTS) mobile phone or device standard to cope with future requirements. The 3GPP may define specifications for the next generation mobile networks, systems, and devices. In one aspect, UMTS has been modified to provide support and specification for the Evolved Universal Terrestrial Radio Access (E-UTRA) and Evolved Universal Terrestrial Radio Access Network (E-UTRAN).

Mobile devices are commonplace in today's society. Such devices typically require power, such as from a battery, to run. Considering that the typical battery life is limited, ways of efficiently utilizing this limited resource, as well as providing good user experience are desirable. In defining the specification, one of the goals of E-UTRA and E-UTRAN is to provide power-saving possibilities on the side of the user device, whether such device is in the idle or active mode.

Often, during an idle mode, mobile devices unnecessarily use power to monitor certain data transmissions. These data transmissions may not include data that the mobile device needs or desires. As such, power of the mobile device may be conserved if the mobile device monitored the transmissions that included necessary data and did not monitor data transmissions that are unnecessary to the mobile device. Accordingly, benefits may be realized from systems and methods that conserve the power supply of the mobile device so that the mobile device is able to function for a longer time period.

DETAILED DESCRIPTION

Figure 1:
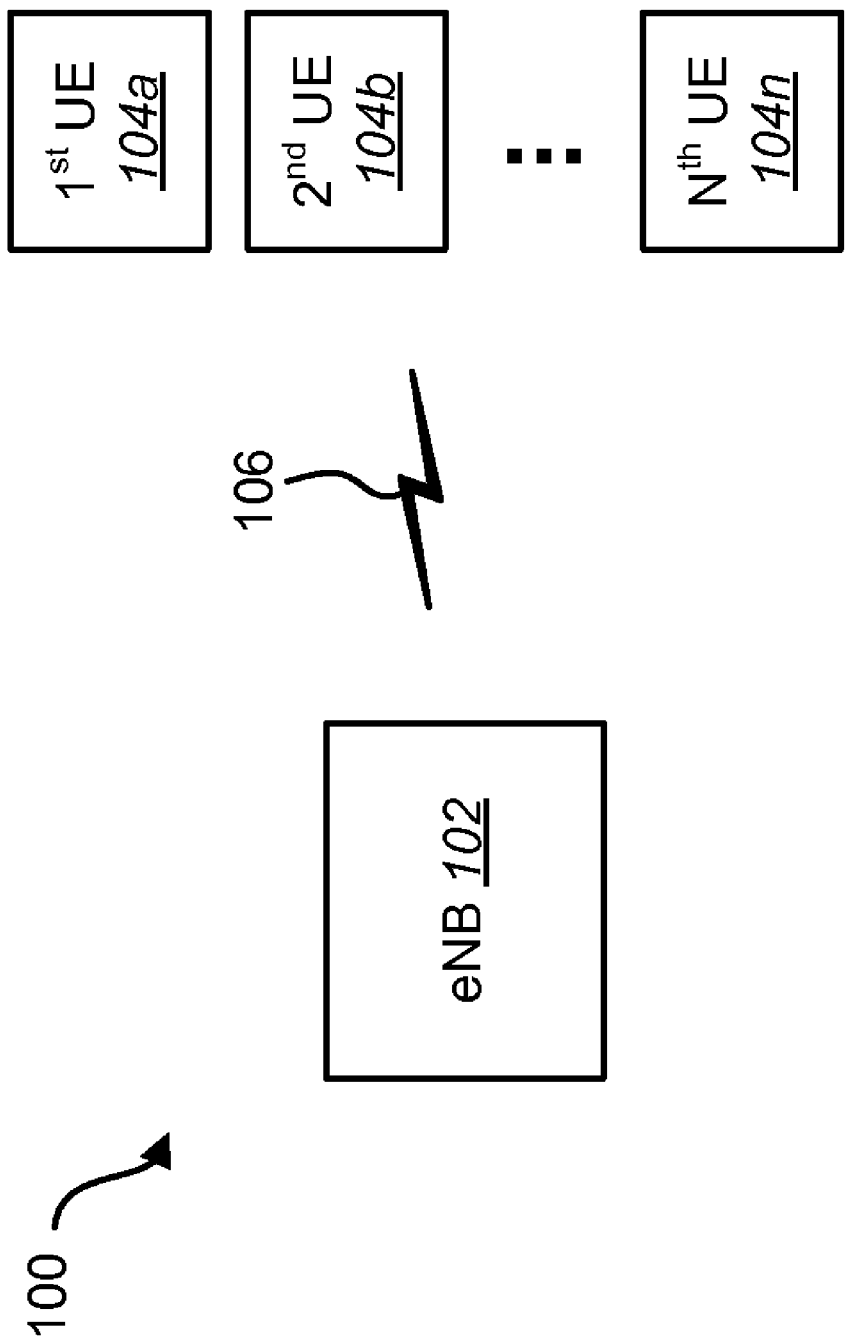
FIG. 1 illustrates an exemplary wireless communication system in which embodiments may be practiced.

A method for conserving the power supply of an Orthogonal Frequency Division Multiplexing (OFDM) communications device is described. The location of control information within one or two of a plurality of symbols is obtained. A sleep mode is entered into. The one or two symbols that include the control information are monitored. A return to the sleep mode is executed.

The control information may include a Channel Control Element (CCE). In one embodiment, the plurality of symbols includes Orthogonal Frequency Division Multiplexing (OFDM) symbols. A determination is made whether the one or two symbols that include the control information also comprise acknowledgment/non-acknowledgment (ACK/NAK) information.

In one embodiment, the location of the control information within one or two of a plurality of symbols is transmitted by an Evolved NodeB to the OFDM communications device. The location of the control information may be transmitted to the OFDM communications device via Radio Resource Control (RRC) signaling.

A communications device in an Orthogonal Frequency Division Multiplexing (OFDM) system is also described. The communications device is configured to conserve its power supply. The communications device includes a processor and memory in electronic communication with the processor. Instructions are stored in the memory. The location of control information within one or two of a plurality of symbols is obtained. A sleep mode is entered into. The one or two symbols that include the control information are monitored. A return to the sleep mode is executed.

A base station that is configured to inform a communications device the location of control information is also described. The base station includes a processor and memory in electronic communication with the processor. Instructions are stored in the memory. N Orthogonal Frequency Division Multiplexing (OFDM) symbols are provided to send a Control Channel Element (CCE) per subframe. N is a natural number. The CCE information for the said communications device is inserted into one or two of the OFDM symbols. The said communications device is informed which OFDM symbols include the CCE information.

Radio Resource Control (RRC) signaling may be used to inform the communications device which OFDM symbol includes the CCE information. The OFDM symbols may transmit a Physical Downlink Control Channel (PDCCH), a Physical Hybrid Automatic Request Indicator Channel (PHICH) and a Physical Control Format Indicator Channel (PCFICH).

An interleaver operation may permutate the CCE information for the said communications device within one OFDM symbol or over two OFDM symbols. In one embodiment, the CCE information is transmitted in one or two OFDM symbols which include a downlink reference signal. The downlink reference signal may be transmitted to a persistent scheduled communications device. The said persistent scheduled communications device may be a Voice Over Internet Protocol communications device.

A computer-readable medium comprising executable instructions is also described. The location of control information within one or two of a plurality of Orthogonal Frequency Division Multiplexing (OFDM) symbols is obtained. A sleep mode is entered into. The one or two symbols that include the control information are monitored. A return to the sleep mode is executed.

Several exemplary embodiments are now described with reference to the Figures. This detailed description of several exemplary embodiments, as illustrated in the Figures, is not intended to limit the scope of the claims.

The word "exemplary" is used exclusively herein to mean "serving as an example, instance or illustration." Any embodiment described as "exemplary" is not necessarily to be construed as preferred or advantageous over other embodiments.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments," unless expressly specified otherwise.

The term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

Conserving power for mobile devices, such as mobile user equipment (UE), is desirable for Long Term Evolution (LTE) communications systems. In general, the principle of saving the power of a UE is to maximize the radio non-reception time (periods of silence) and transmit less during radio reception time (periods of activity). In LTE systems, new physical layer (PHY) techniques may provide better data throughput and user experience for new applications. Similar to other handheld devices, most of the UE devices are powered by a battery. Power savings may be a larger challenge for current 2G and existing 3G systems due to the more complicated processing in the PHY and Radio Frequency (RF) techniques in LTE. As such, benefits may be realized by improving the power savings as much as possible in the design of LTE technologies.

One current effort to reduce the power consumption in UE involves a discontinuous reception mode (DRX) which may allow the UE to enter a sleep mode when there is no data for the UE to receive. Based on the current definition of DRX, during an ON-period, the UE monitors Layer 1 (L1) signaling to learn whether there is downlink (DL) scheduling for the UE. L1 may be the physical layer. If there is DL scheduling, the UE enters into a continuous reception mode. During continuous reception, the UE monitors L1 signaling in every subframe. In one embodiment, L1 signaling is sent in up to three OFDM symbols, which include the physical layer control information. Each subframe may include twelve OFDM symbols. The remaining nine OFDM symbols may carry data to the UE.

LTE L1 signaling in each subframe may include three types of information. First, two bits may be used to distinguish how many OFDM symbols will be used for a Physical Downlink Control Channel (PDCCH) in the LTE system. In one embodiment, the PDCCH includes one, two or three OFDM symbols. The PDCCH may be allocated in the first three OFDM symbols of a subframe. Second, one bit may be used to represent an acknowledgment/non-acknowledgment (ACK/NAK) for each UE. Third, multiple bits may be used to represent a Channel Control Element (CCE). In the L1 signaling, there may be multiple CCEs for different UEs. Within each CCE, an Evolved Node B (eNB) may include the DL scheduling information as well as UL scheduling grant information. The DL scheduling information may include the dynamically scheduled DL transmission resource allocation, which the UE may need in order to receive DL transmissions correctly.

In current systems, the UE receives all three of the L1 DL control OFDM symbols, if there are three OFDM symbols for L1 DL control. However, for one particular UE, there may only be a small portion of information in the L1 control signaling that is needed by the particular UE. As such, power of the UE may be wasted because the UE monitors all three of the OFDM symbols even when information for the UE is not included in all three of the symbols. The present systems and methods conserve the power of the UE during the reception of L1 DL control signaling.

FIG. 1 illustrates an exemplary wireless communication system 100 in which embodiments may be practiced. An Evolved NodeB (eNB) 102 is in wireless communication with one or more pieces of mobile user equipment (UE) 104 (which may also be referred to as mobile stations, user devices, communications devices, subscriber units, access terminals, terminals, etc.). The eNB 102 may also be referred to as a base station. The eNB 102 may be a unit adapted to transmit to and receive data from cells. In one embodiment, the eNB 102 handles the actual communication across a radio interface, covering a specific geographical area, also referred to as a cell. Depending on sectoring, one or more cells may be served by the eNB 102, and accordingly the eNB 102 may support one or more mobile UEs 104 depending on where the UEs are located. In one embodiment, the eNB 102 provides a Long Term Evolution (LTE) air interface and performs radio resource management for the communication system 100.

A first UE 104a, a second UE 104b, and an Nth UE 104n are shown in FIG. 1. The eNB 102 transmits data to the UEs 104 over a radio frequency (RF) communication channel 106. The transmitted data may include a plurality of LTE frames. Each of the LTE radio frames may have a length of 10 ms.

Figure 2:
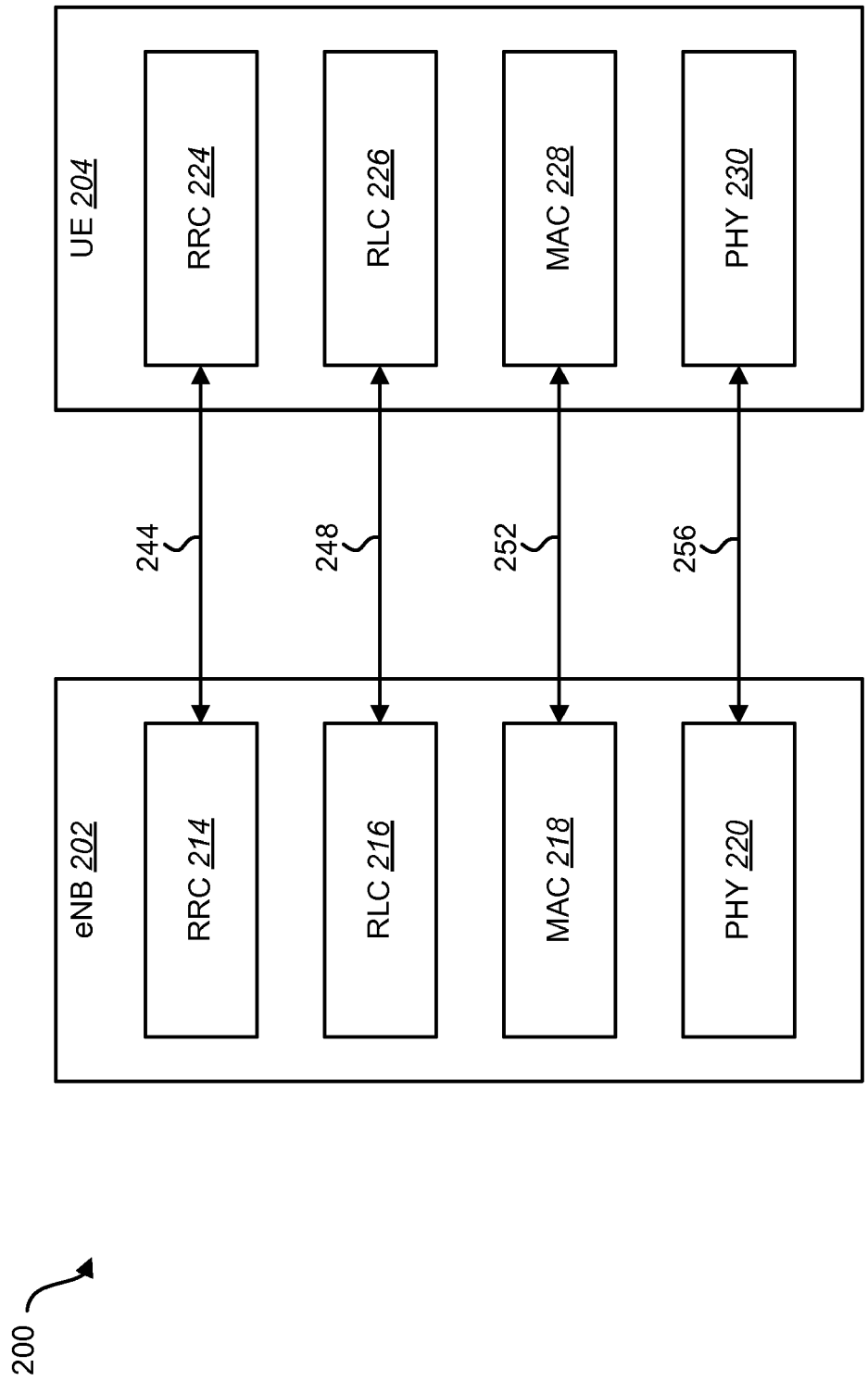
FIG. 2 is a high-level block diagram of exemplary control protocol stacks of a base station, such as an Evolved NodeB (eNB), and a user equipment (UE)

FIG. 2 is an exemplary diagram 200 of a portion of the protocol stack for the control plane of a UE 204 and an eNB 202. The exemplary protocol stacks provide a radio interface architecture between the eNB 202 and the UE 204. In one embodiment, the control plane includes a Layer 1 stack that includes a physical (PHY) layer 220, 230, a Layer 2 stack that includes a medium access control (MAC) 218, 228 layer, and a Radio Link Control (RLC) layer 216, 226, and a Layer 3 stack that includes a Radio Resource Control (RRC) layer 214, 224.

The RRC layer 214, 224 is generally a Layer 3 radio interface adapted to provide information transfer service to the non-access stratum. The RRC layer of the present systems and methods also transfers the location of Control Channel Element (CCE) information from the eNB 202 to the UE 204, as well as provide RRC connection management.

The RLC 216, 226 is a Layer 2 radio interface adapted to provide transparent, unacknowledged, and acknowledged data transfer service. The MAC layer 218, 228 is a radio interface layer providing unacknowledged data transfer service on the logical channels and access to transport channels. The MAC layer 218, 228 may be adapted to provide mappings between logical channels and transport channels.

The PHY layer 220, 230 generally provides information transfer services to MAC 218, 228 and other higher layers 216, 214, 226, 224. Typically the PHY layer transport services are described by their manner of transport. Furthermore, the PHY layer 220, 230 may be adapted to provide multiple control channels. In one embodiment, the UE 204 is adapted to monitor this set of control channels. Furthermore, as shown, each layer communicates with its compatible layer 244, 248, 252, 256.

Figure 3:
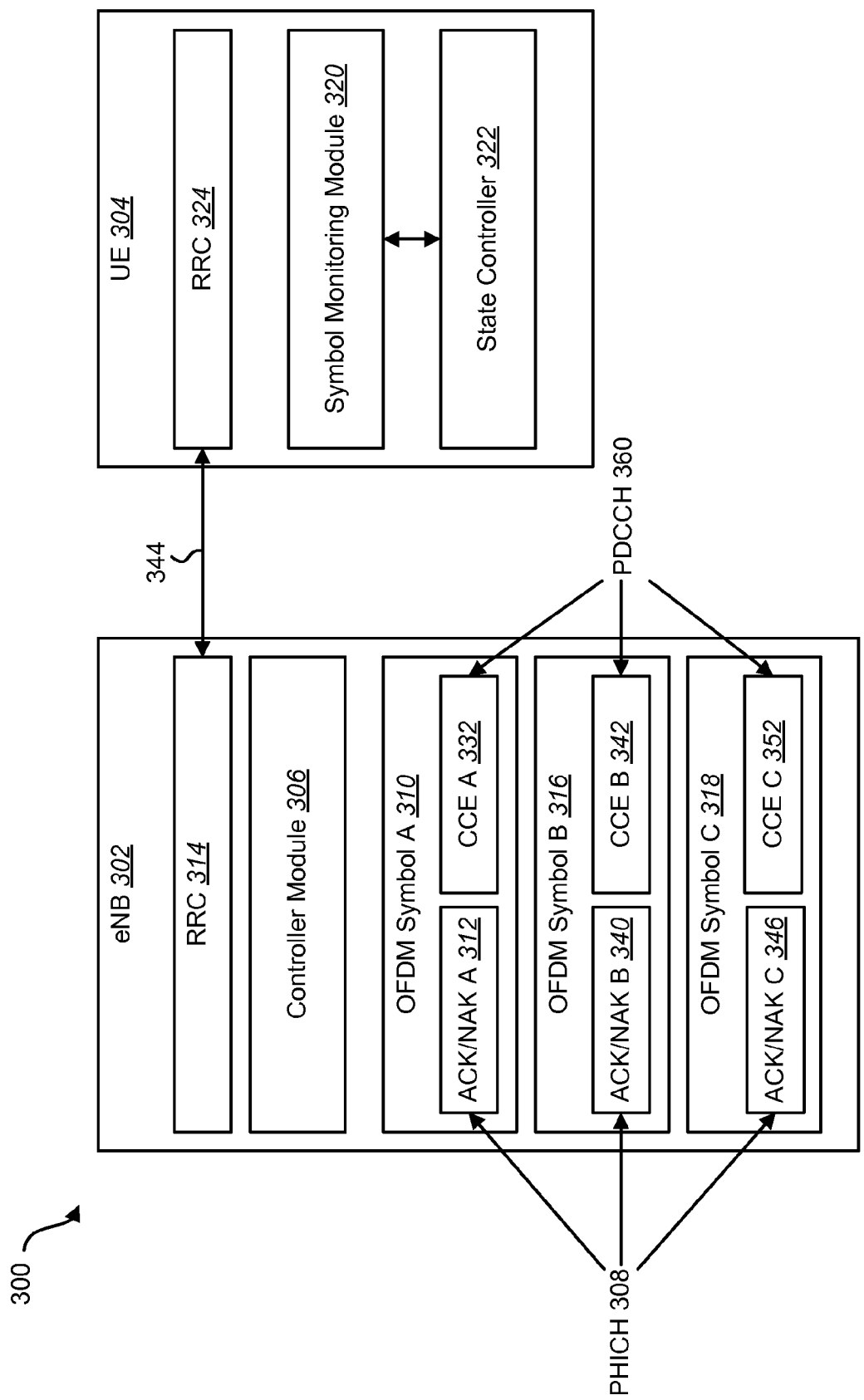
FIG. 3 is a block diagram of one embodiment of an eNB and a UE.

FIG. 3 is a block diagram 300 of one embodiment of an eNB 302 and a UE 304. The eNB 302 may include a controller module 306 that inserts ACK/NAK A 312 bit and Control Channel Element (CCE) A 332 information into an OFDM symbol. The controller module 306 may insert ACK/NAK A 312 and CCE A 332 intended for the UE 304 into a single OFDM symbol, such as OFDM symbol A 310. The controller module 306 may also insert ACK/NAK B 340 and CCE B 342 intended for a different UE into a different single OFDM symbol, such as OFDM symbol B 316. Further, the controller module 306 may insert ACK/NAK C 346 and CCE C 346 intended for a different UE into a different single OFDM symbol, such as OFDM symbol C 318.

In one embodiment, n OFDM symbols may be intended for each UE. For example, OFDM symbol A 310, OFDM symbol A1 (not shown) and OFDM symbols A2 (not shown) may be intended for the UE 304. Similarly, OFDM symbol B 316, OFDM symbol B1 (not shown) and OFDM symbol B2 (not shown) may be intended for different UE. In other words, there may be three OFDM symbols intended for each UE. A Physical Hybrid Automatic Request Indicator Channel (PHICH) 308 may include several ACK/NAK such as ACK/NAK A 312, ACK/NAK B 340 and ACK/NAK C 346. A PDCCH 360 may include several CCEs like CCE A 332, CCE B 342 and CCE C 352. The PHICH 308 and the PDCCH 360 may be included in n OFDM symbols. As previously explained, n OFDM symbols may be three OFDM symbols.

The eNB 302 may indicate the location of ACK/NAK A 312 and CCE A 332 to the UE 304. In other words, the eNB 302 indicates to the UE 304 which of the n OFDM symbols includes ACK/NAK A 312 and CCE A 332. In one embodiment, RRC 314 signaling is used to inform the UE 304 of the location of the ACK/NAK and the CCE. The RRC 314 signaling may be utilized to inform the UE 304 of the location of ACK/NAK A 312 which is included in PHICH 308 as well as the location of CCE A 332 which is included in PDCCH 360. The PHICH 308 and the PDCCH 360 may include the part of one or more OFDM symbols 310, 316, 318. As illustrated, a single OFDM symbol, such as OFDM symbol A 310, includes ACK/NAK A 312 and CCE A 332. The CCE for a certain UE may be restricted to one OFDM symbol. In addition, the ACK/NAK and CCE should be located in the same OFDM symbol whenever possible. The location of CCE and the ACK/NAK may be restricted in the same OFDM symbol with downlink reference signals. The ACK/NAK and CCE may be in the same OFDM symbol at the time the eNB 302 starts dynamic scheduling data transmission. The location of the CCE for a certain UE may be kept in the same single OFDM symbol. The location of the CCE may be configured during the connection setup phase of the UE. In addition, the location may be updated by a scheduler if there is such a need.

In another embodiment, the ACK/NAK and the CCE are not included in the same OFDM symbol. For example, ACK/NAK A 312 may be included in OFDM symbol A 310 and CCE A 332 may be included in OFDM symbol Al (not shown).

In one embodiment, CCE A 332, CCE B 342 and CCE C 352 include necessary information for decoding data. CCE 332, 342, 352 may include resource allocation (allocated time and frequency information of resource), modulation and coding scheme (MCS), Hybrid Automatic Request (HARQ) information, etc. The information provided by a CCE may be necessary for a UE to decode downlink (DL) data signals and modulate uplink (UL) data signals.

The UE 304 also includes the RRC layer 324 and communicates through RRC signaling 344 with the corresponding RRC 314 layer of the eNB 302. The UE 304 further includes a symbol monitoring module 320 that monitors symbols received on the PHICH 308 and the PDCCH 360 from the eNB 302. In one embodiment, the symbol monitoring module 320 monitors OFDM symbols which include the PHICH 308 and the PDCCH 360. The location of an ACK/NAK and a CCE may be provided to the monitoring module 320 through RRC signaling 344. In a further embodiment, the UE 304 knows which OFDM symbol the DL ACK/NAK is located in from the UL resource grant. For a persistent scheduled UE, such location may be fixed. Alternatively, RRC signaling 344 may be used to inform such location as well if needed.

A state controller 322 controls the state of the UE 304. The state may include an awake state or a sleep state. A UE in the sleep state uses less power than a UE in the awake state. The monitoring module 320 may notify the state controller 322 when the OFDM symbol that includes an ACK/NAK or a CCE is to be received. In addition, the symbol monitoring module 320 identifies whether CCE and DL ACK/NAK are in the same OFDM symbol. If the UE 304 receives the location of CCE via RRC signaling 344, the symbol monitoring module 320 may determine that the ACK/NAK and CCE are not located in the same OFDM symbol. If they are located in the same symbol, the state controller 322 may cause the UE to enter the awake state in order to receive the ACK/NAK and the CCE from the one OFDM symbol. The state controller 322 may then cause the UE to enter a sleep state and not monitor other OFDM symbols that may be transmitted to the UE 304. If the CCE and ACK/NAK are not located in the same OFDM symbol, the state controller 322 may cause the UE 304 to remain in the awake mode to receive two OFDM symbols. In one embodiment, reducing the number of OFDM symbols that the UE monitors conserves the power supply of the UE 304.

In one embodiment, the UE 304 is allowed to wake up and receive one or two of the three OFDM symbols of DL L1 signaling in order to receive the related L1 control signaling for its UL transmission and DL resource allocation included in CCE. If the CCE and the DL ACK/NAK are located in the same OFDM symbol, the UE 304 may need to only receive the single OFDM symbol that includes both the CCE and the DL ACK/NAK. Otherwise, the UE 304 may receive two OFDM symbols. In one embodiment, the number of UEs allocated to a certain subframe determines whether the ACK/NAK and CCE are located in the same OFDM symbol. The location of CCE may be updated by the controller module 306 of the eNB 302 if needed. RRC signaling 344 may be used to inform the UE 304 of the updated location. The present systems and methods may be implemented for a dynamic scheduling UE. However, for a persistent scheduling UE, the present systems and methods enable the UE to only receive one OFDM symbols the majority of time.

In one embodiment, dynamic scheduling occurs for Transmission Control Protocol (TCP) data transmission. In connection with dynamic scheduling, resource allocation information for DL data and resource grant for UL data may be included in a CCE. Persistent scheduling may occur for Voice Over Internet Protocol (VoIP). In persistent scheduling, there is no CCE in a PDCCH. So, during a DL silence period, a UE may only need to receive the ACK/NAK. The UE 304 may check only one OFDM symbol every 20 milliseconds (ms). For a persistent scheduled UE, the location of the DL ACK/NAK may be fixed. By including the CCE intended for the UE 304 in the same OFDM symbol as the one that includes the DL ACK/NAK, the persistent scheduled UE may monitor the L1 DL control in one single OFDM symbol. When there is a dynamic scheduled UL transmission, there would be a different DL ACK/NAK location in L1 control OFDM symbols. As previously mentioned, for a dynamic scheduled UE, the DL ACK/NAK location may not be fixed in the OFDM symbols. However, since both the UE and the eNB know the location of the DL ACK/NAK, the UE may take advantage of having the CCE restricted in only one OFDM symbol. In one embodiment, the UE may monitor two OFDM symbols in order to receive all the needed L1 DL control information.

Figure 4:
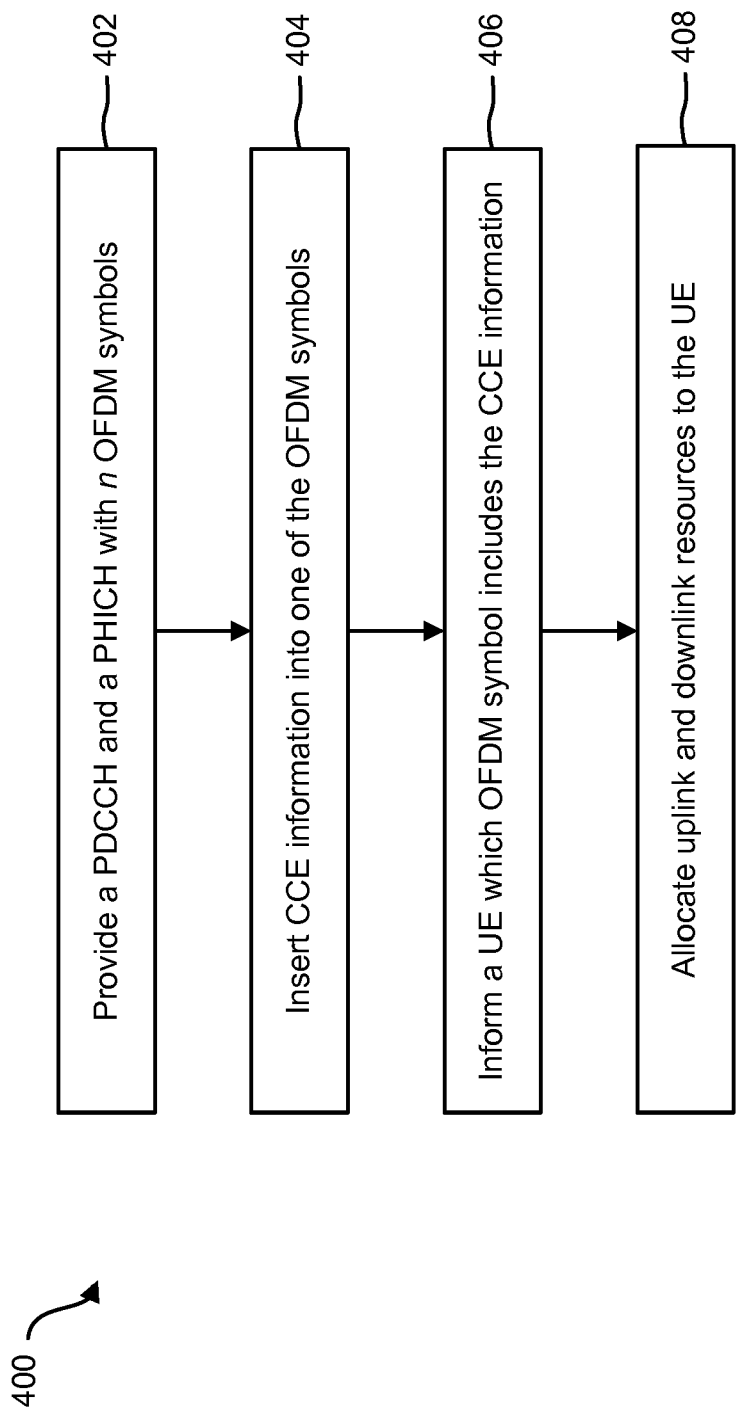
FIG. 4 is a flow diagram illustrating one embodiment of a method for informing a UE the location of Control Channel Element (CCE) information.

FIG. 4 is a flow diagram illustrating one embodiment of a method 400 for informing a UE of the location of a CCE. The method 400 may be implemented by the eNB 102. A PDCCH and a PHICH may be provided 402 with n OFDM symbols per subframe. In one embodiment, n is a natural number. The PDCCH and the PHICH may be carried by the OFDM symbols to the UE during a DL silence period of the UE. CCE information may be inserted 404 into one of the OFDM symbols. In one embodiment, the CCE information is inserted 404 into the same OFDM symbol that includes ACK/NAK information. In another embodiment, the CCE information is inserted 404 into a different OFDM symbol that does not include ACK/NAK information The UE may be informed 406 as to which OFDM symbol includes the CCE information. In addition, UL and DL resources may be allocated 408 to the UE. The location of the CCE information (i.e., which OFDM symbol includes the CCE) may be provided to the UE through RRC signaling. Further, the UL and DL resources may be allocated 408 to the UE through RRC signaling. The UE may be informed 406, 408 of the location of the CCE information as well as the allocated UL and DL resources during a connection setup of the UE. The call setting-up phase may be the phase during which the UE is registering with the eNB before transmissions are sent or received.

The sleep state mentioned above may be referred to as a pico-sleep state. The pico-sleep state may be the state the UE is in when only the CCE information or the ACK/NAK is retrieved. The RRC signaling of the eNB may be used to inform the UE of the duration of the pico-sleep state. In one embodiment, CCE information may be inserted into two of the OFDM symbols.

Figure 5:
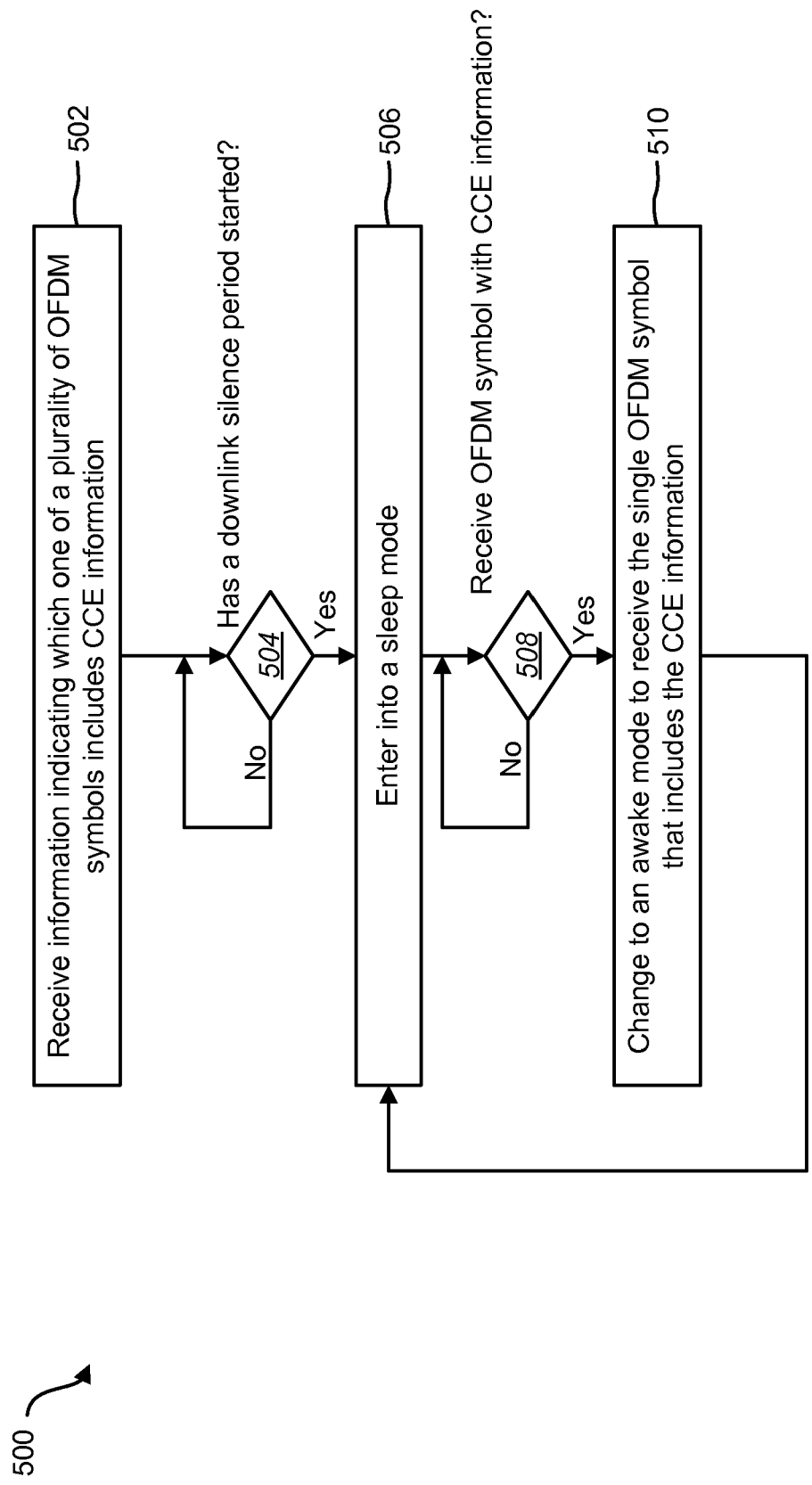
FIG. 5 is a flow diagram illustrating one embodiment of a method for conserving the power supply of a UE.

FIG. 5 is a flow diagram illustrating one embodiment of a method 500 for conserving the power supply of a user device. In one embodiment, the user device is a UE and the method 500 may be implemented by the UE. The method 500 may be implemented during a DL silence period. Information may be received 502 that indicate which one of a plurality of OFDM symbols includes CCE information.

A determination 504 is made as to whether a DL silence period has started. If the DL silence period has not started, the method 500 enters a repeating loop until the DL silence period has begun. After the DL silence period has started, the UE enters 506 into a sleep mode. The sleep mode may include powering down the majority of applications and functions available on the UE. The sleep mode is utilized to consume a minimum amount of power from the power source of the UE. A determination 508 is made as to whether the OFDM symbol that includes the CCE information is received. If the OFDM symbol with the CCE is not received, the UE remains in the sleep mode. When the OFDM symbol that includes the CCE is received, the UE changes 510 to an awake mode in order to receive the single OFDM symbol that includes the CCE information. In one embodiment, the UE may receive information indicating which two of a plurality of OFDM symbols include CCE information.

Figure 6:
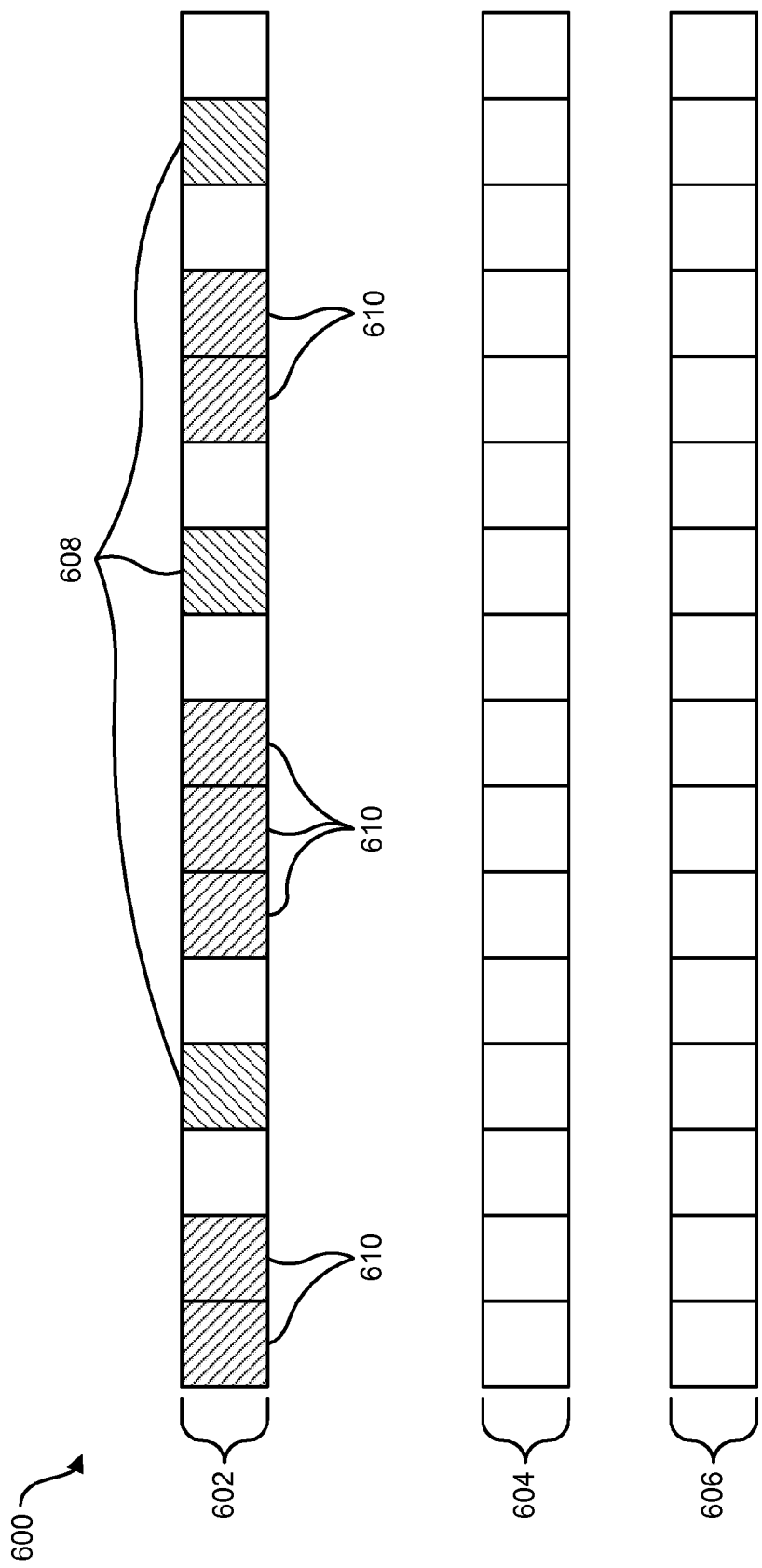
FIG. 6 is an embodiment of a plurality of Orthogonal Frequency Division Multiplexing (OFDM) symbols.

FIG. 6 is an embodiment 600 of a plurality of OFDM symbols 602, 604, 606. A first OFDM symbol 602 may include ACK/NAK information 608 and CCE information 610 for a certain UE. A UE in a pico-sleep mode may only monitor the OFDM symbol that includes the ACK/NAK information 608 and the CCE information 610 during a DL silence period. The UE may change from the pico-sleep mode to an awake mode in order to receive the first OFDM symbol 602. After receiving the ACK/NAK information 608 and the CCE information 610 from the first OFDM symbol 602, the UE may return to the pico-sleep mode and ignore the remaining OFDM symbols 604, 606. In one embodiment, the UE receives downlink signals on the first OFDM symbol in order to decode the ACK/NAK 608 and the CCE 610.

Figure 7:
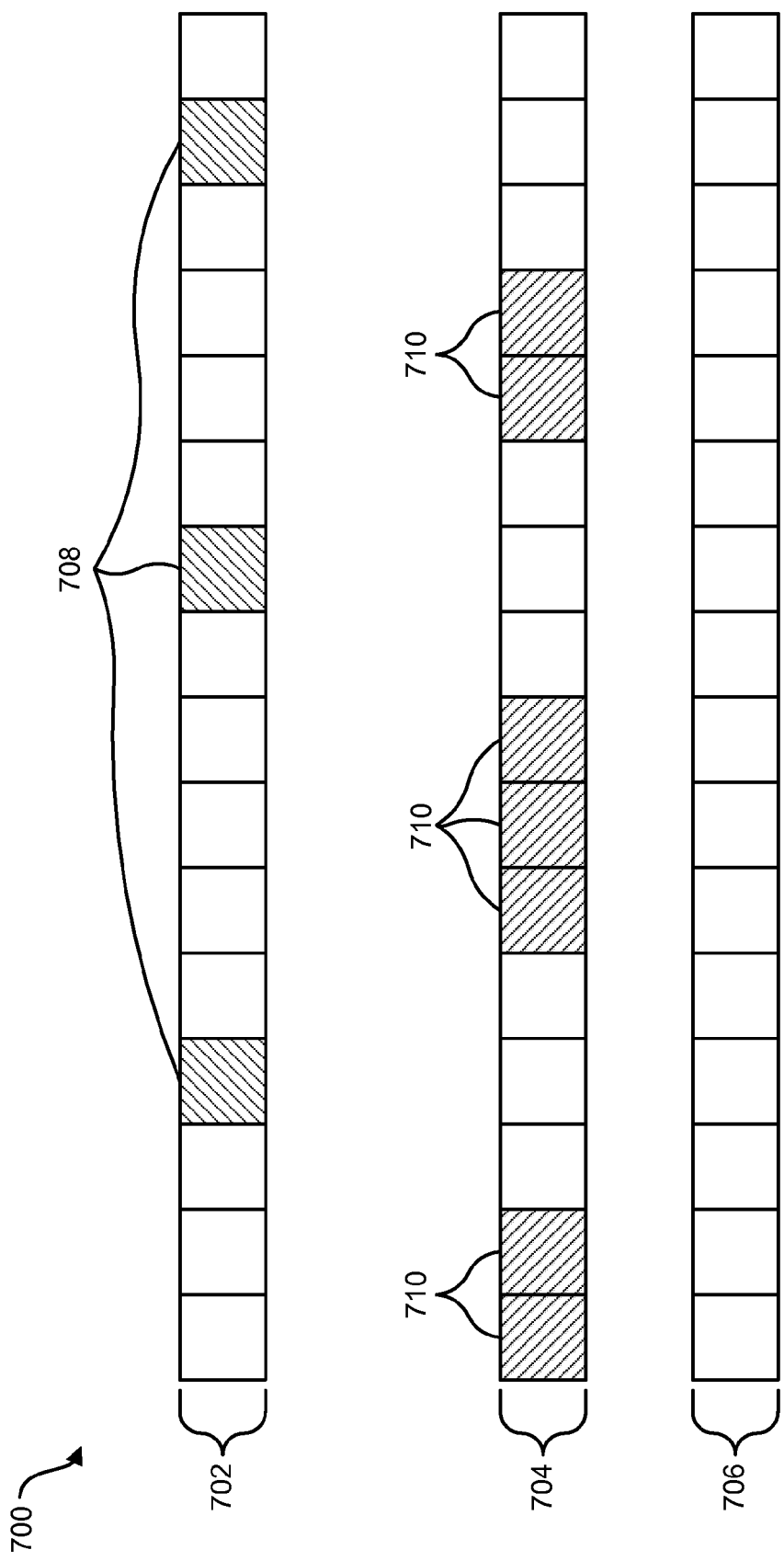
FIG. 7 is a further embodiment of a plurality of OFDM symbols.

FIG. 7 is another embodiment 700 of a plurality of OFDM symbols 702, 704, 706. A first OFDM symbol 702 may include ACK/NAK information 708 for a certain UE. A second OFDM symbol 704 may include CCE information 710 for the UE. A UE in a pico-sleep mode may only monitor the OFDM symbols that include the ACK/NAK information 708 and the CCE information 710 during a DL silence period. The UE may change from the pico-sleep mode to an awake mode in order to receive the first OFDM symbol 702 and the second OFDM symbol 704. After receiving the ACK/NAK information 708 from the first OFDM symbol 702 and the CCE information 710 from the second OFDM symbol 704, the UE may return to the pico-sleep mode and ignore a remaining OFDM symbol 706.

In another embodiment, the CCE information 610, 710 may be transmitted during dynamic scheduling. In other words, the CCE information 610, 710 may be included in one OFDM symbol when there is no ACK/NAK information 608, 708.

Figure 8:
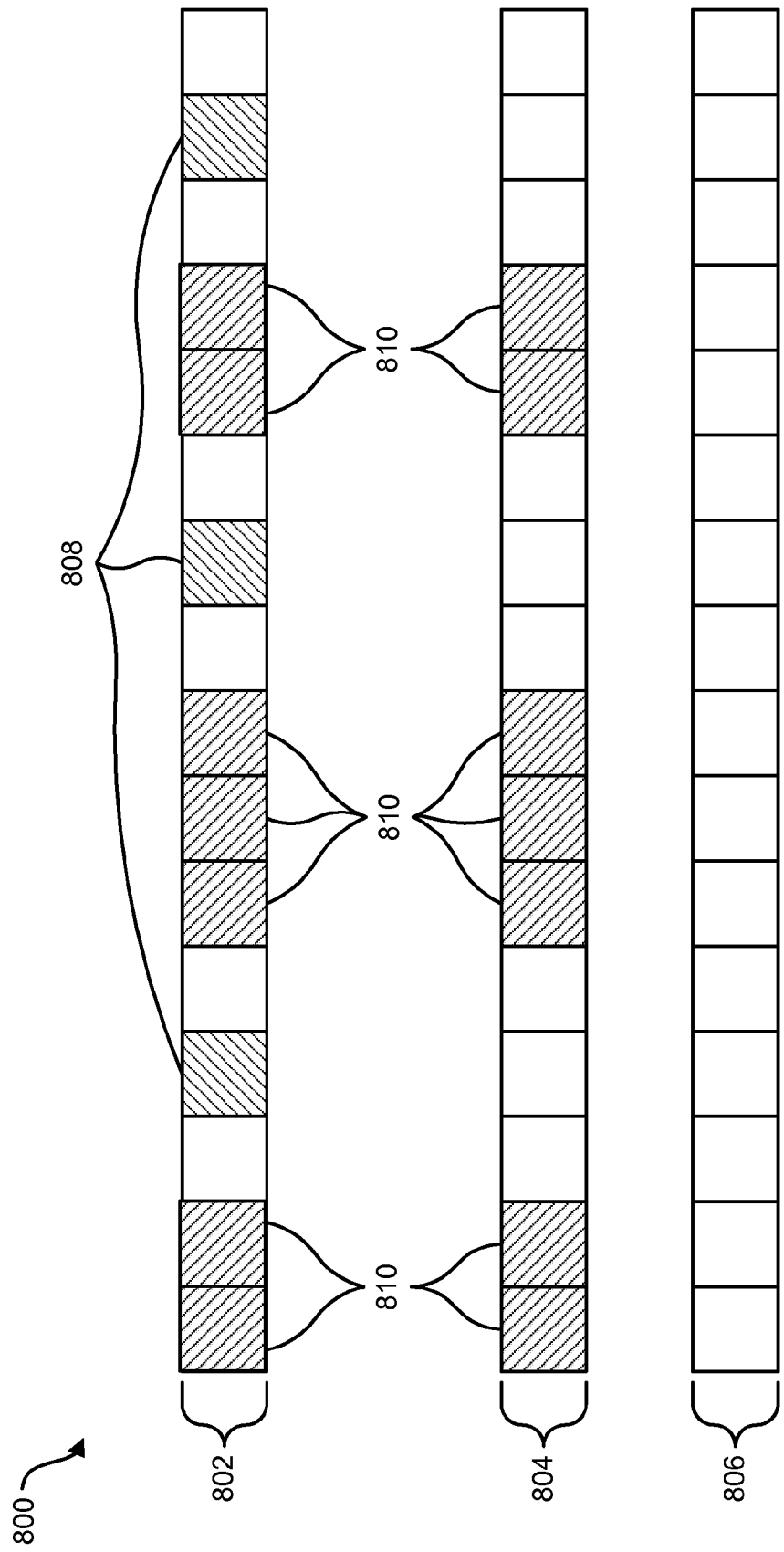
FIG. 8 is another embodiment of a plurality of OFDM symbols.

FIG. 8 is a further embodiment of a plurality of OFDM symbols 802, 804, 806. In one embodiment, a first OFDM symbol 802 includes ACK/NAK information 808 and CCE information 810. In addition, a second OFDM symbol 804 also includes the CCE information 810. In other words, the CCE information 810 is transmitted in two OFDM symbols. During dynamic scheduling, the CCE information 810 may be included in the first OFDM symbol 802, the second OFDM symbol 804 or both without the ACK/NAK information 808.

Figure 9:
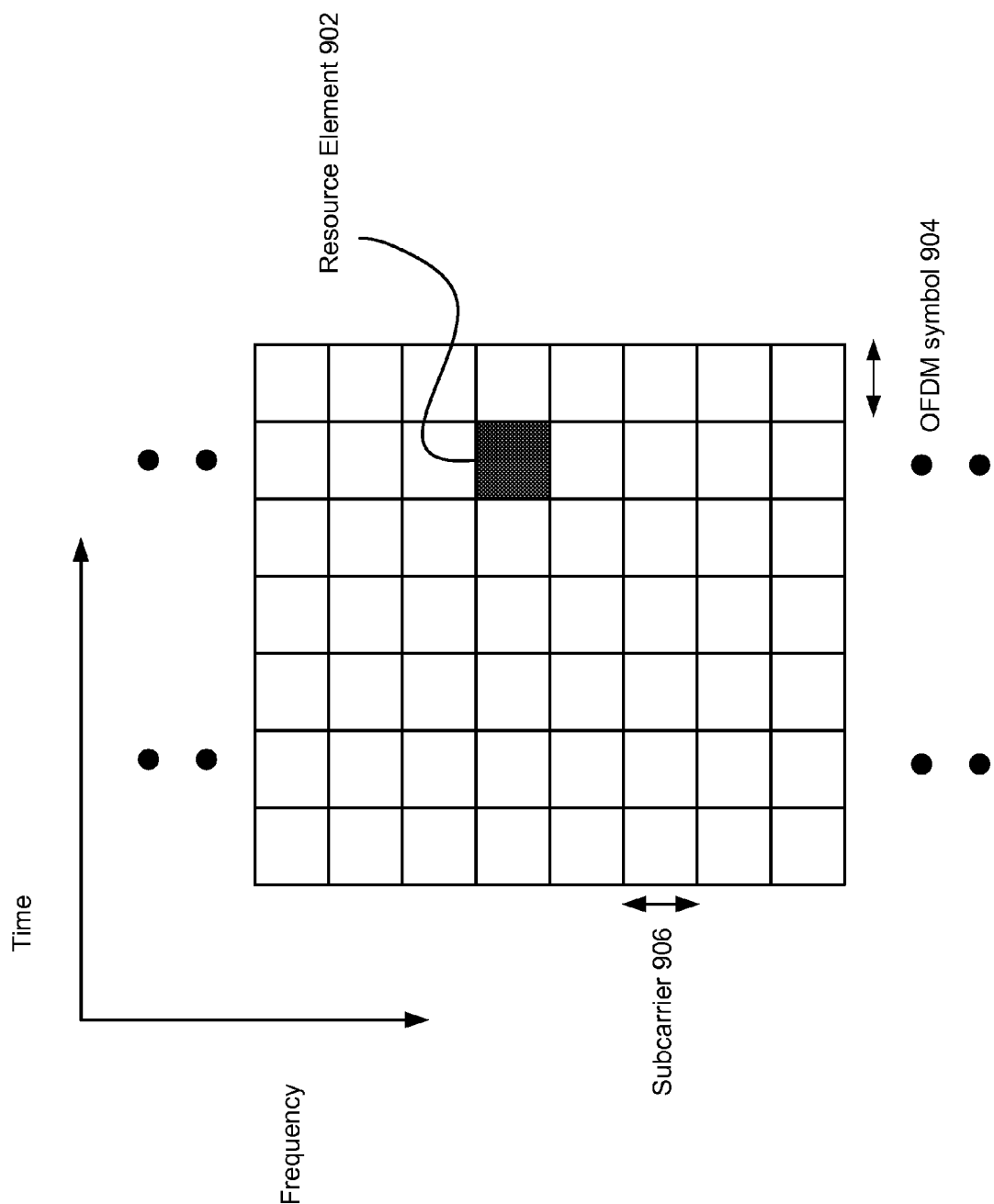
FIG. 9 is one embodiment of one or more subcarriers that include one or more OFDM symbols.

FIG. 9 is one embodiment of one or more subcarriers 906 that include one or more OFDM symbols 904. In one embodiment, each downlink control channel may include one or more CCEs. All CCEs to be transmitted in a subframe may be mapped to physical resource elements (RE) 902. Physical RE 902 may correspond to each subcarrier 906 and OFDM symbol 904. The CCE may be scrambled by cell-specific bit scrambling. Following Quadrature Phase Shift Keying (QPSK) modulation, modulated signals may be interleaved, shifted by a cell-specific number and mapped to REs. The interleaver operation may decide whether each CCE for a certain UE is permutated within one OFDM symbol or over two OFDM symbols. In other words, the location of the CCE for a certain UE may be restricted within one or two OFDM symbols.

Figure 10:
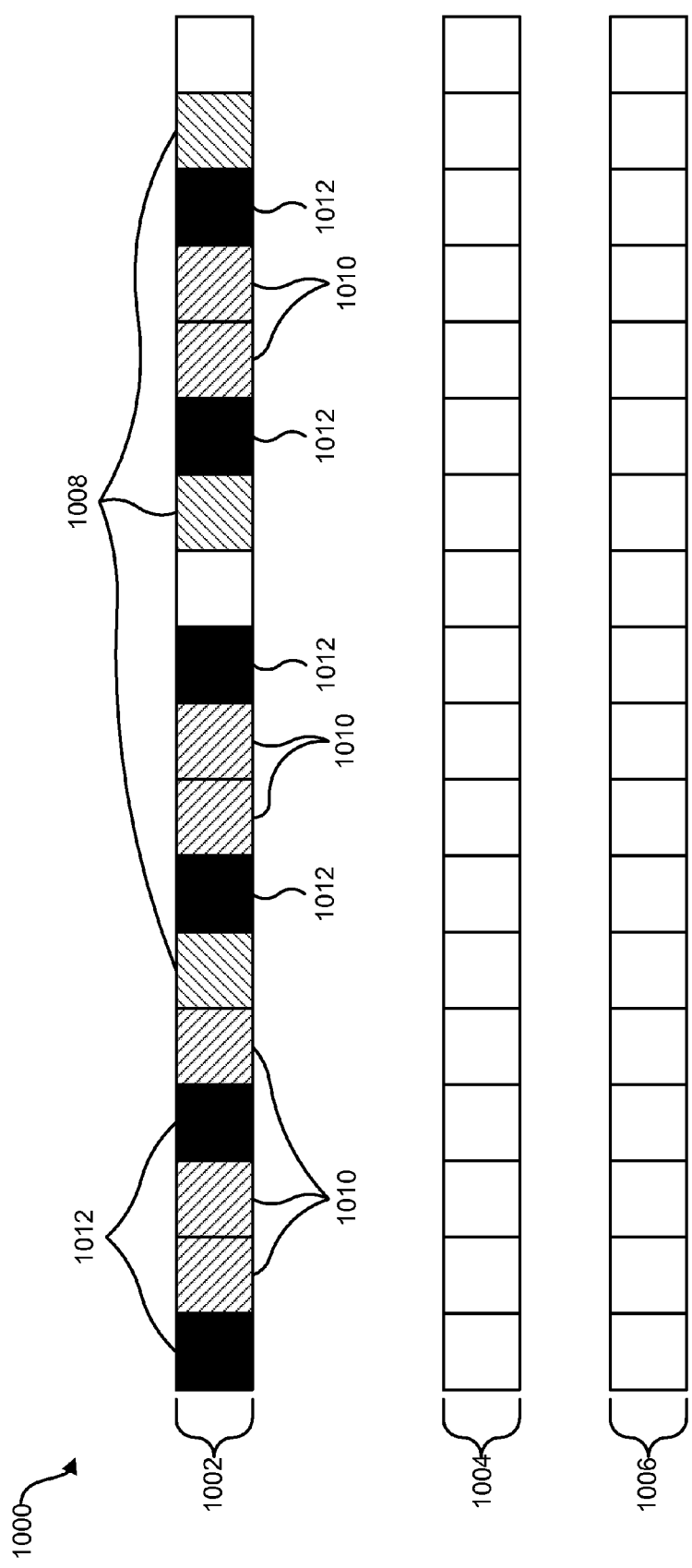
FIG. 10 is further embodiment of a plurality of OFDM symbols in which the eNB includes two transmit antennas.

FIG. 10 is another embodiment of a plurality of OFDM symbols 1002, 1004, 1006 in which an eNB includes two transmit antennas. Downlink reference signals 1012 transmitted from antenna ports 0 and 1 may be on a first OFDM symbol 1002 in each subframe. The UE may receive the downlink reference signals 1012 on the first OFDM symbol 1002 in order to decode ACK/NAK information 1008 and CCE information 1010.

Figure 11:
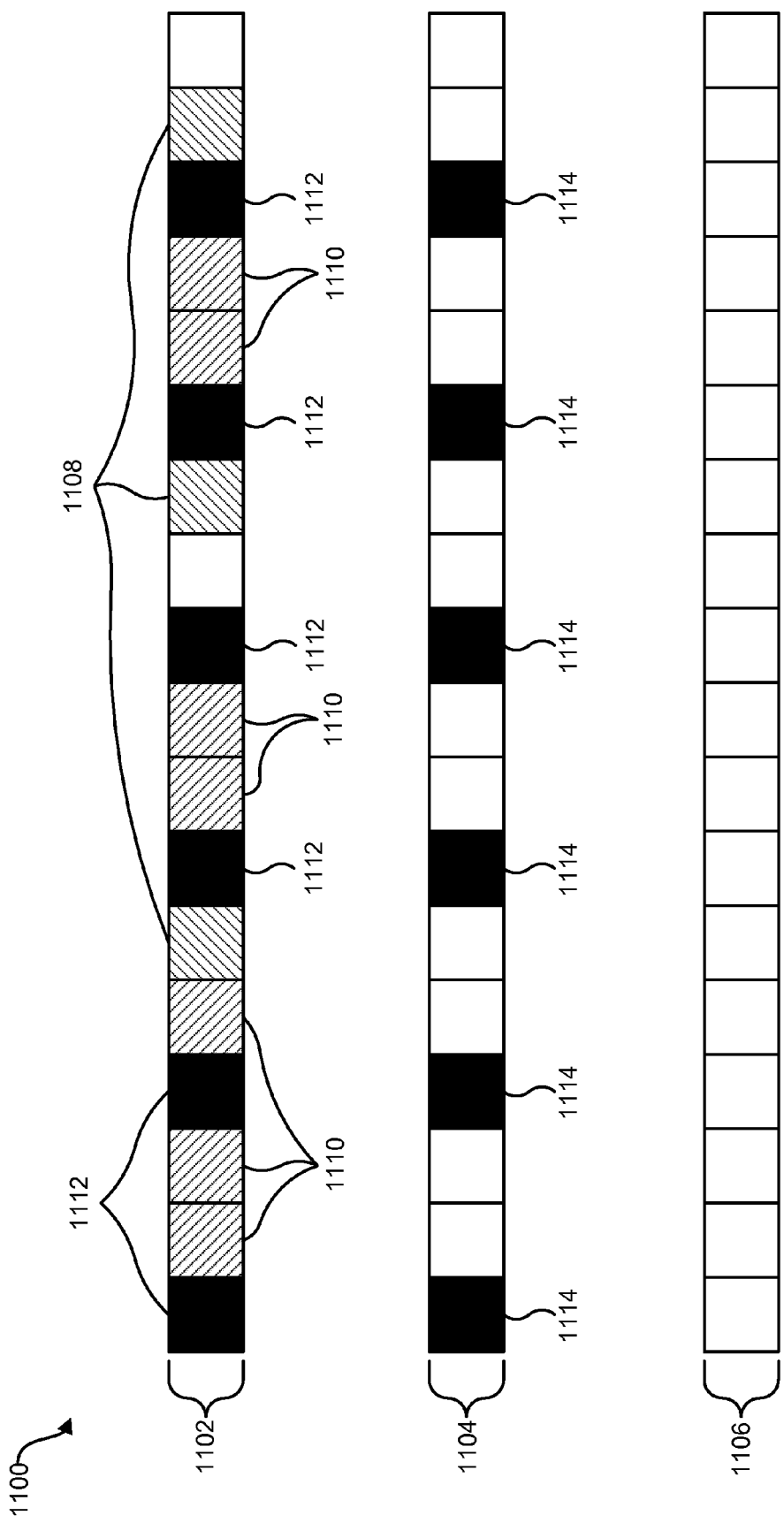
FIG. 11 is another embodiment of a plurality of OFDM symbols in which the eNB includes four transmit antennas.
Figure 12:
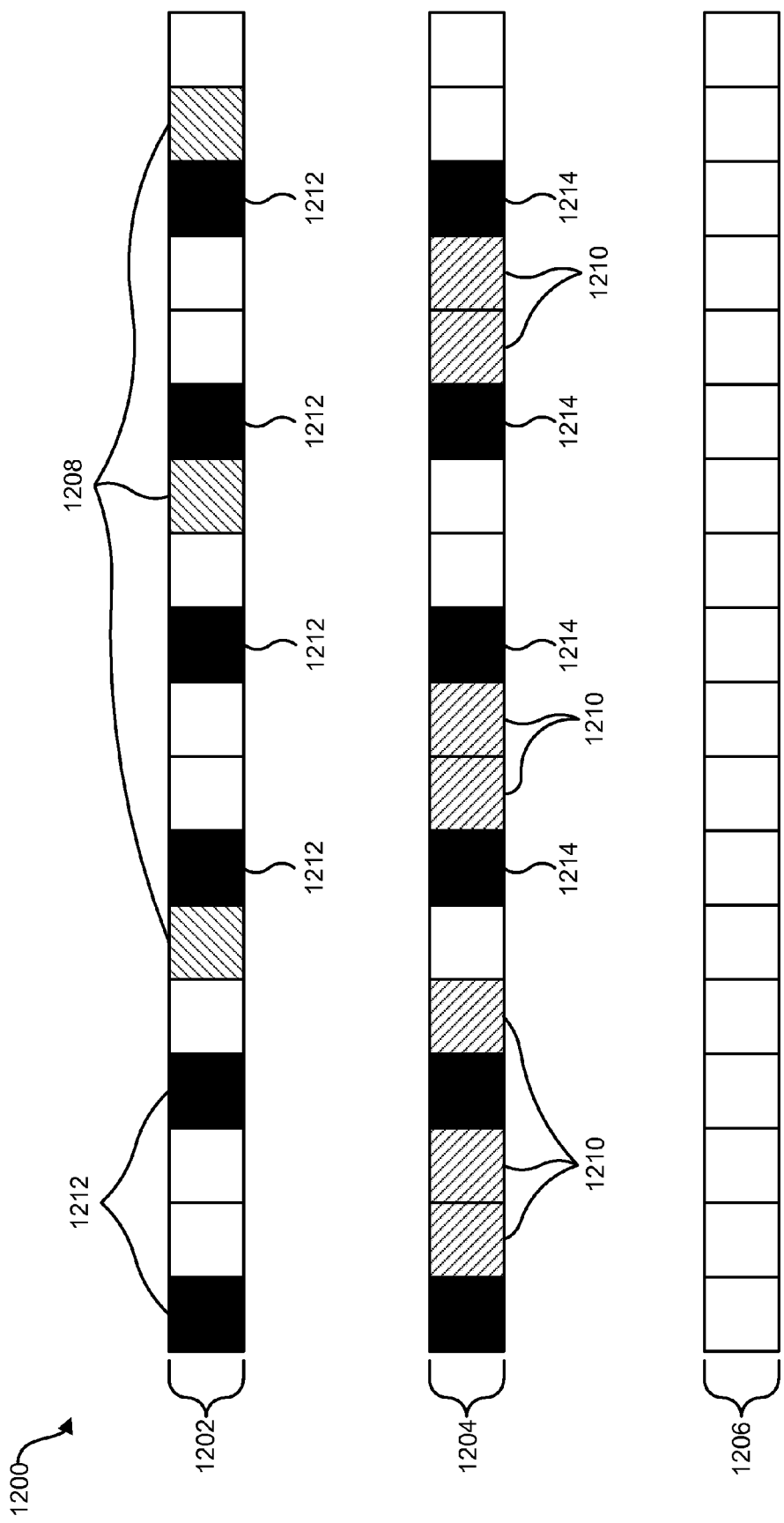
FIG. 12 is an embodiment of CCE information inserted on a second OFDM symbol.

FIG. 11 is further embodiment of a plurality of OFDM symbols 1102, 1104, 1106 in which an eNB includes four transmit antennas. Downlink reference signals 1112 transmitted from antenna ports 0 and 1 may be on a first OFDM symbol 1102 in each subframe. In addition, downlink reference signals 1114 from antenna ports 2 and 3 may be on a second OFDM symbol 1104 in each subframe. The UE may receive downlink reference signals 1112, 1114 on the first and second OFDM symbols 1102, 1104 in order to decode ACK/NAK information 1108 and CCE information 1110. As illustrated, the CCE information 1110 is inserted on the first OFDM symbol 1102 in each subframe. FIG. 12 is an embodiment of CCE information 1210 inserted on a second OFDM symbol 1204. In the embodiments illustrated in FIGS. 11 and 12, the UE may wake up to receive the first and second OFDM symbols in each subframe.

Moreover, if the CCE is transmitted on the OFDM symbol(s) that include(s) downlink reference signals, the UE may wake up to receive the OFDM symbol(s) that include(s) downlink reference signals. In other words, the pico-sleep mode becomes more efficient. This may be beneficial for to save power in persistent scheduled UEs, e.g. UEs in VoIP mode.

Figure 13:
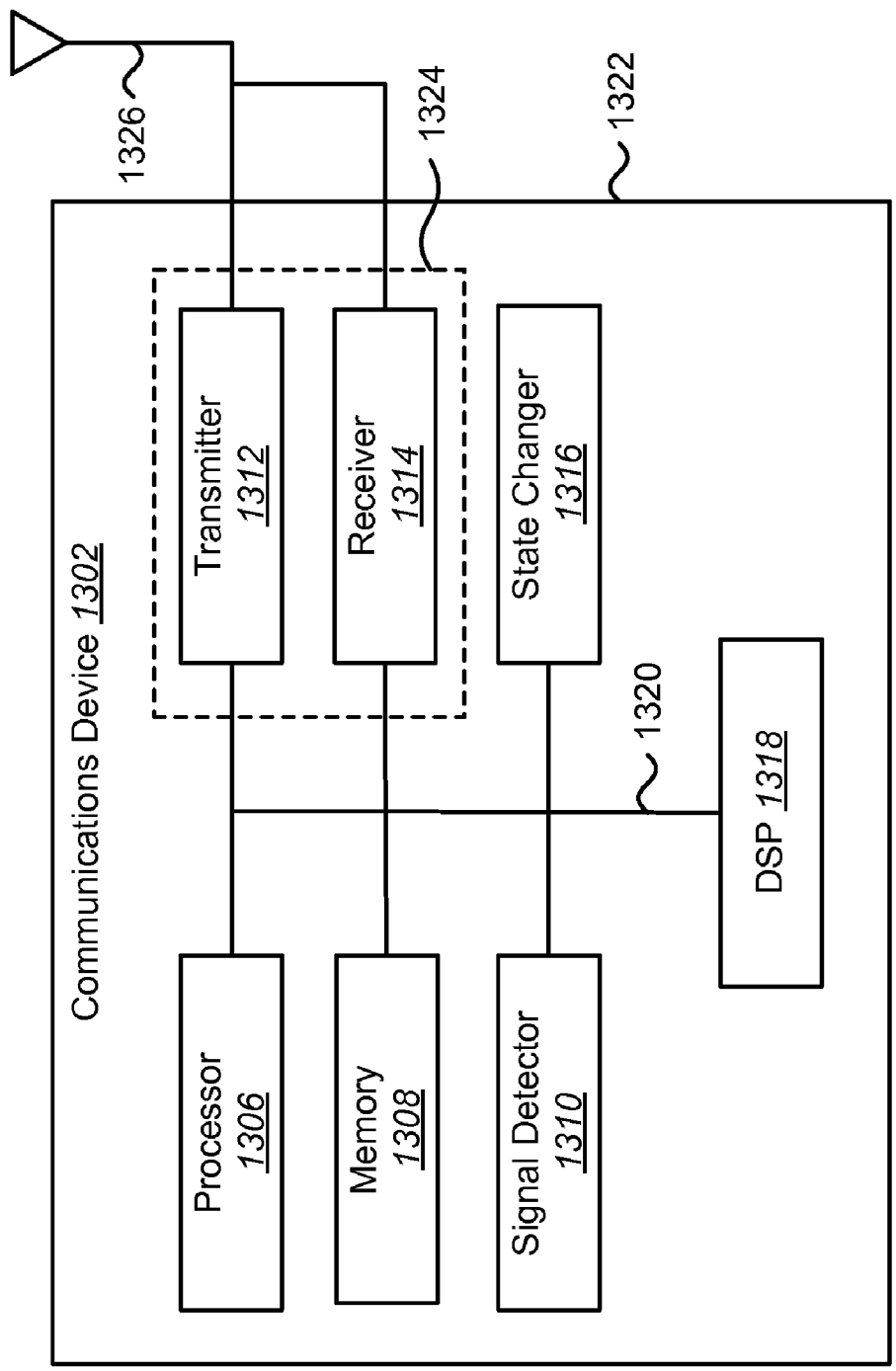
FIG. 13 illustrates various components that may be utilized in a communications device.

FIG. 13 illustrates various components that may be utilized in a communications device 1302, such as a UE, in accordance with one embodiment. The device 1302 includes a processor 1306 which controls operation of the device 1302. The processor 1306 may also be referred to as a CPU.

Memory 1308, which may include both read-only memory (ROM) and random access memory (RAM), provides instructions and data to the processor 1306. A portion of the memory 1308 may also include non-volatile random access memory (NVRAM). The memory 1308 may include any electronic component capable of storing electronic information, and may be embodied as ROM, RAM, magnetic disk storage media, optical storage media, flash memory, on-board memory included with the processor 1306, EPROM memory, EEPROM memory, registers, a hard disk, a removable disk, a CD-ROM, etc. The memory 1308 may store program instructions and other types of data. The program instructions may be executed by the processor 1306 to implement some or all of the methods disclosed herein.

The device 1302 may also include a housing 1322 that includes a transmitter 1312 and a receiver 1314 to allow transmission and reception of data between the communications device 1302 and a remote location. The transmitter 1312 and receiver 1314 may be combined into a transceiver 1324. An antenna 1326 is attached to the housing 1322 and electrically coupled to the transceiver 1324.

The communications device 1302 also includes a signal detector 1310 used to detect and quantify the level of signals received by the transceiver 1324. The signal detector 1310 detects such signals as total energy, power spectral density and other signals.

A state changer 1316 of the device 1302 controls the state of the device 1302 based on a current state and additional signals received by the transceiver 1324 and detected by the signal detector 1310. The device 1302 is capable of operating in any one of a number of states.

The various components of the device 1302 are coupled together by a bus system 1320 which may include a power bus, a control signal bus, and a status signal bus in addition to a data bus. However, for the sake of clarity, the various busses are illustrated in FIG. 13 as the bus system 1320. The device 1302 may also include a digital signal processor (DSP) 1318 for use in processing signals.

Figure 14:
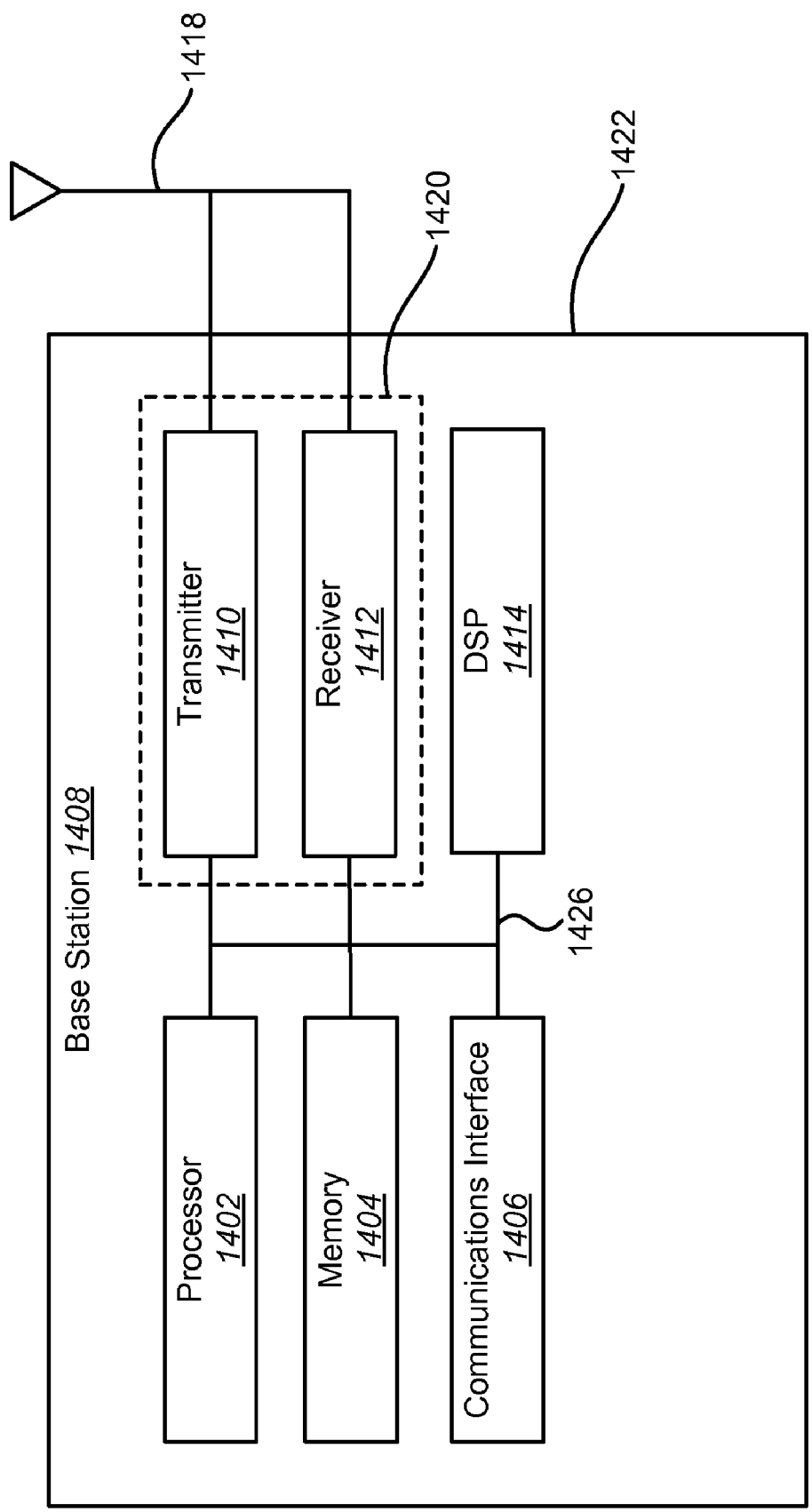
FIG. 14 illustrates various components that may be utilized in a base station.

FIG. 14 is a block diagram of a base station 1408 in accordance with one embodiment of the disclosed systems and methods. The base station 1408 may be an eNB, a base station controller, a base station transceiver, etc. The base station 1408 includes a transceiver 1420 that includes a transmitter 1410 and a receiver 1412. The transceiver 1420 may be coupled to an antenna 1418. The base station 1408 further includes a digital signal processor (DSP) 1414, a general purpose processor 1402, memory 1404, and a communication interface 1406. The various components of the base station 1408 may be included within a housing 1422.

The processor 1402 may control operation of the base station 1408. The processor 1402 may also be referred to as a CPU. The memory 1404, which may include both read-only memory (ROM) and random access memory (RAM), provides instructions and data to the processor 1402. A portion of the memory 1404 may also include non-volatile random access memory (NVRAM). The memory 1404 may include any electronic component capable of storing electronic information, and may be embodied as ROM, RAM, magnetic disk storage media, optical storage media, flash memory, on-board memory included with the processor 1402, EPROM memory, EEPROM memory, registers, a hard disk, a removable disk, a CD-ROM, etc. The memory 1404 may store program instructions and other types of data. The program instructions may be executed by the processor 1402 to implement some or all of the methods disclosed herein.

In accordance with the disclosed systems and methods, the antenna 1418 may receive reverse link signals that have been transmitted from a nearby communications device 1302, such as a UE. The antenna 1418 provides these received signals to the transceiver 1420 which filters and amplifies the signals. The signals are provided from the transceiver 1420 to the DSP 1414 and to the general purpose processor 1402 for demodulation, decoding, further filtering, etc.

The various components of the base station 1408 are coupled together by a bus system 1426 which may include a power bus, a control signal bus, and a status signal bus in addition to a data bus. However, for the sake of clarity, the various busses are illustrated in FIG. 14 as the bus system 1426.

The present systems and methods described herein relate to 3GPP LTE systems. However, the present systems and methods may be utilized for other OFDM communication systems, for example IEEE 802.16m.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the embodiments disclosed herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

While specific embodiments have been illustrated and described, it is to be understood that the claims are not limited to the precise configuration and components illustrated above. Various modifications, changes and variations may be made in the arrangement, operation and details of the embodiments described above without departing from the scope of the claims.

What is claimed is:

1. A method for conserving the power supply of an Orthogonal Frequency Division Multiplexing (OFDM) communications device, comprising:
    obtaining a location of control information within one or two of a plurality of symbols, wherein the plurality of symbols comprises Layer (L1) downlink (DL) control symbols;
    entering into a sleep mode;
    monitoring the one or two symbols that include the control information, and not monitoring at least one symbol of the plurality of symbols;
    returning to the sleep mode; and
    wherein the OFDM communications device comprises a user equipment (UE).

2. The method of claim 1, wherein the control information comprises a Channel Control Element (CCE).

3. The method of claim 1, wherein the plurality of symbols comprises Orthogonal Frequency Division Multiplexing (OFDM) symbols.

4. The method of claim 1, further comprising determining if the one or two symbols that comprise the control information also comprise acknowledgment/non-acknowledgment (ACK/NAK) information.

5. The method of claim 1, wherein the location of the control information within one or two of a plurality of symbols is received from an Evolved NodeB.

6. The method of claim 5, wherein the location of the control information is received by the OFDM communications device via Radio Resource Control (RRC) signaling.

7. A communications device in an Orthogonal Frequency Division Multiplexing (OFDM) system, wherein the communications device is configured to conserve its power supply, the communications device comprising:
    a processor;
    memory in electronic communication with the processor;
    instructions stored in the memory, the instructions being executable to:
        obtain a location of control information within one or two of a plurality of symbols, wherein the plurality of symbols comprises Layer (L1) downlink (DL) control symbols;
        enter into a sleep mode;
        monitor the one or two symbols that include the control information, and not monitor at least one symbol of the plurality of symbols;
        return to the sleep mode; and
        wherein the OFDM communications device comprises a user equipment (UE).

8. The communications device of claim 7, wherein the control information comprises a Channel Control Element (CCE).

9. The communications device of claim 7, wherein the plurality of symbols comprises Orthogonal Frequency Division Multiplexing (OFDM) symbols.

10. The communications device of claim 7, wherein the instructions are further executable to determine if the one or two symbols that comprise the control information also comprise acknowledgment/non-acknowledgment (ACK/NAK) information.

11. The communications device of claim 7, wherein the location of the control information within one or two of a plurality of symbols is received from an Evolved NodeB.

12. The communications device of claim 11, wherein the location of the control information is received by the OFDM communications device via Radio Resource Control (RRC) signaling.

13. A base station that is configured to inform a communications device of a location of control information, the base station comprising:
    a processor;
    memory in electronic communication with the processor;
    instructions stored in the memory, the instructions being executable to:
        provide n Orthogonal Frequency Division Multiplexing (OFDM) symbols to send a Control Channel Element (CCE) per subframe, wherein n is a natural number;
        insert the CCE information for the said communications device into one or two of the OFDM symbols; and
        inform the said communications device which OFDM symbols include the CCE information.

14. The base station of claim 13, wherein Radio Resource Control (RRC) signaling is used to inform the communications device which OFDM symbol includes the CCE information.

15. The base station of claim 13, wherein the OFDM symbols transmit a Physical Downlink Control Channel (PD- CCH), a Physical Hybrid Automatic Request Indicator Channel (PHICH) and a Physical Control Format Indicator Channel (PCFICH).

16. The base station of claim 13, wherein an interleaver operation permutates the CCE information for the said communications device within one OFDM symbol or over two OFDM symbols.

17. The base station of claim 13, wherein the instructions are further executable to transmit the CCE information in one or two OFDM symbols which comprise a downlink reference signal, wherein the downlink reference signal is transmitted to a persistent scheduled communications device and wherein the said persistent scheduled communications device comprises a Voice Over Internet Protocol communications device.

18. A non-transitory computer-readable medium comprising executable instructions for:
   obtaining a location of control information within one or two of a plurality of Orthogonal Frequency Division Multiplexing (OFDM) symbols, wherein the plurality of symbols comprises Layer 1 (L1) downlink (DL) control symbols;
   entering into a sleep mode by an Orthogonal Frequency Division Multiplexing (OFDM) communications device;
   monitoring the one or two symbols that include the control information, and not monitoring at least one symbol of the plurality of symbols;
   returning to the sleep mode; and
   wherein the OFDM communications device comprises a user equipment (UE).

19. The computer-readable medium of claim 18, wherein the control information comprises a Channel Control Element (CCE).

20. The computer-readable medium of claim 18, wherein the instructions are further executable for determining if the one or two OFDM symbols that comprise the control information also comprise acknowledgment/non-acknowledgment (ACK/NAK) information.

21. The computer-readable medium of claim 18, wherein the location of the control information within one or two of a plurality of OFDM symbols is received from an Evolved NodeB.

22. The computer-readable medium of claim 21, wherein the location of the control information is received by the OFDM communications device via Radio Resource Control (RRC) signaling.

* * * * *